Feb. 18, 1930.                J. C. MONTEITH                 1,747,726
                              SPRING CONTROLLER
                             Filed Jan. 19, 1927
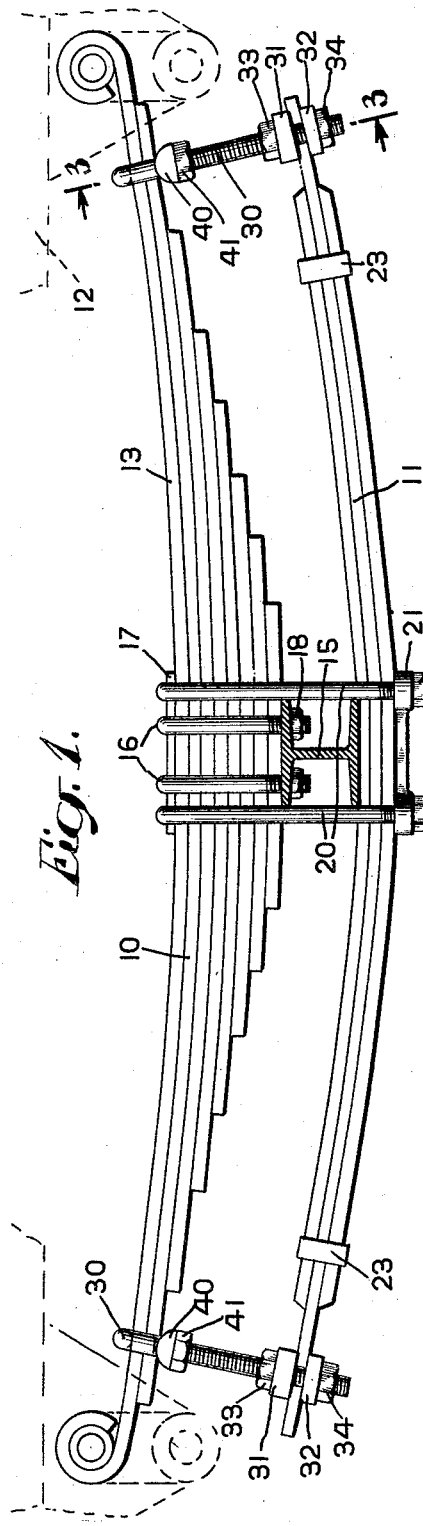
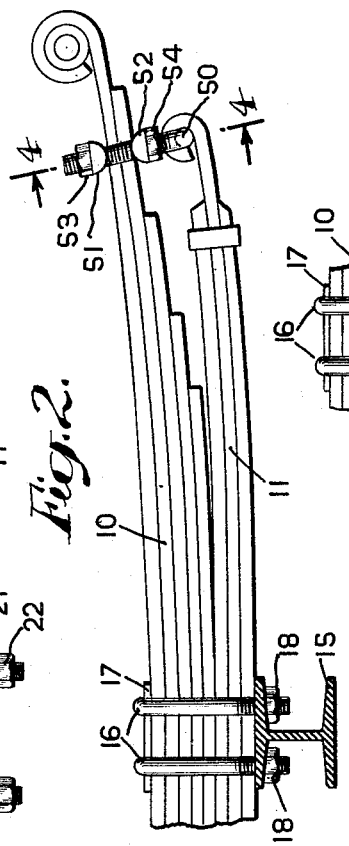
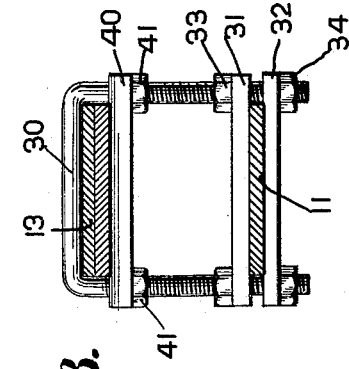
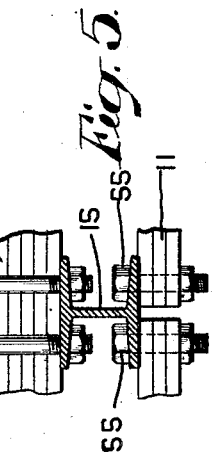
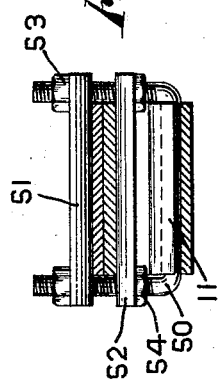
Inventor
John C. Monteith
By his Attorney
Albert M. Austin Patented Feb. 18, 1930

1,747,726

UNITED STATES PATENT OFFICE

JOHN C. MONTEITH, OF CLEVELAND, OHIO, ASSIGNOR TO THE STERLING SPRING COMPANY, OF CLEVELAND, OHIO, A CORPORATION OF DELAWARE

SPRING CONTROLLER

Application filed January 19, 1927. Serial No. 161,976.

This invention relates to spring members and more particularly to a controller for vehicle springs which is adapted to be readily attached to a vehicle chassis so as to co-operate with the main chassis spring for cushioning road shocks.

This invention further relates to a spring of the above character which may be attached to a vehicle without mechanical alterations of either the chassis or the spring.

Vehicle springs which are constructed so as to have practically identical characteristics in compression and in recoil when operating to cushion road shocks will cause the chassis to oscillate should the oscillations occur in synchronism with the applied shocks, and they may increase in amplitude until the movement of the vehicle chassis becomes sufficiently great to cause discomfort to the passengers or injury to the mechanical parts.

This invention provides means for preventing the vehicle chassis from being set into oscillation in response to road shocks. This is accomplished by providing an auxiliary spring which may be readily attached to a vehicle chassis spring of usual construction, means being also provided for causing the auxiliary spring to exert a false load upon the main spring and for adjusting the amount of the initial false load.

In addition to cooperating with the chassis spring in checking rebounds and assisting the main spring to cushioning road shocks without causing the vehicle chassis to oscillate excessively the controller constructed in accordance with this invention may also be designed to stiffen the main spring when heavy loads are applied thereto, and thereby enable heavy loads to be carried without injury to the mechanism of the vehicle.

Although the novel features which are believed to be characteristic of this invention will be pointed out with particularity in the claims appended hereto, the invention itself, as to its objects and advantages, the mode of its operation and the manner of its organization may be better understood by referring to the following description taken in connection with the accompanying drawings forming a part thereof, in which Fig. 1 is an elevation of the controller constructed in accordance with this invention applied to a semi-elliptic vehicle chassis spring;

Fig. 2 shows a modified form thereof in which the controller is above the axle;

Fig. 3 is a section taken on the line 3—3 of Fig. 1;

Fig. 4 is a section taken on the line 4—4 of Fig. 2; and

Fig. 5 shows a modification of the controller and means for attaching the same to a vehicle axle.

Referring more particularly to the figures, Fig. 1 illustrates the usual form of semi-elliptic spring 10 to which is applied the controller mechanism 11. Chassis spring 10 comprises a plurality of leaves of progressively decreasing length designed in accordance with the usual spring construction so that the greater cross section of the spring occurs at the point where the bending movement is the largest.

The spring may be attached to the vehicle chassis 12 in any well known manner such as by extending the upper leaf 13 and curling the ends thereof to form knuckles which cooperate with suitable link mechanism for pivotally attaching the two ends of the spring to the lower part of the chassis.

The spring may be attached to the axle 15 of an automobile which has been herein shown as an I-beam axle although any other common type of axle may be employed in place thereof, by means of U-bolts 16 which are passed around the leaves of spring 10 and around bearing plate 17 which is placed adjacent to the upper leaf of said spring. The U-bolt is provided with threaded ends extending through suitable openings in the upper flange of the I-beam axle. Nuts 18 may be threaded on said ends for rigidly clamping the axle and spring leaves together.

Controller 11, constructed in accordance with this invention, is adapted to be attached below the vehicle axle extending on both sides thereof and to have its ends connected to the chassis spring. Controller 11 is shown in Fig. 1 as attached to the lower side of axle 16 by means of U-bolts 20 which are passed around the bearing plate 17 and the upper spring 10, and provided with threaded extensions which project through suitable holes in bearing plate 21. The threaded extensions are adapted to receive nuts 22 by means of which the assembly may be firmly clamped together. The upper surface of bearing plate 21 is preferably similar in contour to the lower surface of axle 15 in order to provide means for firmly clamping the leaves of the controller therebetween.

The controller may comprise any required number of leaves depending upon the strength of each leaf and upon the required characteristics of the entire assembly. The controller has been herein shown, however, as comprising three leaves, the central leaf being extended to provide means for attaching the controller to the leaves of the main spring and the shorter top and bottom leaves being fastened to the central leaf by means of strap 23.

One means which may be employed for attaching the free ends of controller 11 to the ends of spring 10 comprises a U-bolt 30 which is passed around upper leaf 13 of spring 10, the horizontal portion of the U-bolt contacting with the upper surface of said leaf. A U-bolt 30 may be provided with threaded vertical members which are passed through suitable holes in cross bars 31 and 32 disposed respectively above and below the extended leaf on controller 11. Nuts 33 and 34 may be threaded upon U-bolt 30 for contacting with cross bars 31 and 32, and rigidly clamping the U-bolt to the upper and lower surfaces respectively of said extended leaf.

In order to cause the controller to act when the leaves thereof have been distorted below their free point, in which case the U-bolt would be under compression, a cross bar 40 may be provided contacting with the lower surface of one of the leaves of spring 10 and holding it in engagement therewith by means of nut 41. Inasmuch as it is necessary to provide for a certain amount of pivotal movement of the U-bolt during flexure of the spring cross bar 40 may have a rounded upper surface so as to provide substantially aligned contact with the leaves of the main spring. Furthermore, cross bar 40 should not be adjusted to rigidly clamp the main spring but should be left sufficiently loose to allow such lateral movement of the U-bolt as may be neccessary during use.

In the modification shown in Fig. 2 of the drawing controller 11 is applied above the axle 15 of the vehicle, replacing the three lower leaves of spring 10. Spring 10 is assumed to be constructed in a similar manner to the spring shown in Fig. 1 and to be similarly attached to a vehicle chassis. In certain cases, such as in vehicles equipped with a low axle it may be inconvenient to apply the controller below the lower surface of the axle. In such cases the controller may be applied above the axle, a number of the lower leaves of the main spring corresponding to the number of leaves in the controller being removed, if necessary, to provide space for the insertion thereof. The controller may be formed to substitute for the removed leaves in order to avoid altering the characteristics of the spring itself.

When the controller is applied in this manner it is only necessary to loosen nuts 18 on U-bolts 16, remove the lower leaves of the spring, if necessary, and insert the controller in the proper place. The controller is then held in rigid engagement with the axle without the employment of additional clamping means. The free ends of the controller may, if desired, be connected to the leaves of the main spring by a link mechanism similar to that disclosed in Fig. 1.

An alternative method of connecting said leaves is disclosed in Fig. 2, comprising inverted U-bolt 50, the horizontal portion of which is extended through a suitable knuckle formed integral with the longer spring leaf of the controller. The horizontal portion of the U-bolt, being preferably of cross-section similar to that of the interior of the knuckle on said controller, should preferably be sufficiently loosely mounted therein to provide for pivotal movement around the knuckle as an axis.

The threaded ends of U-bolt 50 may be extended through holes in cross bars 51 and 52 mounted respectively above and below the leaves of the main spring and held in engagement therewith by means of suitable nuts 53 and 54. Cross bars 51 and 52 should preferably be provided with curved surfaces or surfaces of other contour adapted to give a line contact with the cooperating leaves of the spring. Furthermore, these cross bars should be adjusted to loosely clamp the leaves of the main spring in order to provide for both pivotal and longitudinal movement as may be required during use.

Fig. 5 is a fragmentary view of a modified form of controller which may be attached below the axle 15, the ends of the leaves of controller 11 being firmly attached to the lower surface of axle 15 by means of bolts 55. A controller connected in this manner may be constructed to extend practically the entire length of the main spring, as shown in Fig. 1, or it may be constructed in two parts, one part extending forwardly and the other rearwardly of the axle, and both clamped firmly thereto by bolts 55 as above specified.

Certain specific types of controller have been herein disclosed and certain preferred means have been shown for attaching this controller both to the axle of the vehicle and to the free end of the main spring. Obviously these means may be varied as desired without departing from the scope of this invention. The connections disclosed have been illustrated merely as a preferred form or embodiment of this invention in order to render the disclosure complete and clear, and not as a limitation thereon.

The above described controller after being applied to a vehicle is adjusted so that the free end is normally distorted from its natural position of rest in a direction toward the main spring. The connecting means is therefore placed under tension and the controller operates to impress a false load upon the main spring. The amount of this initial false load may be accurately adjusted by varying the effective length of the connecting means. This load is variable in accordance with the position which the main spring is forced to assume during use, and should sufficient force be applied to the main spring to cause the controller to compress beyond its original free position the latter will then be in a condition of compression similar to that of the main spring and will assist the main spring in carrying the load.

The controller above described may be considered to possess two outstanding characteristics either or both of which may be usefully employed in cushioning road shocks and in supporting the vehicle load. When the controller is above its natural free point it operates to exert a downward force or a false load upon the main spring which will tend to prevent excessive recoil and will assist the main spring in compressing in response to a road shock. The main spring is, therefore, caused to more readily respond to a road shock, but is retarded in its upward movement thereby largely absorbing the shock and passing it to the vehicle chassis with different characteristics.

In addition to the above feature the controller when compressed beyond its free point will tend to assist the main spring in carrying heavy loads such as a load sufficient to compress the spring by this amount. The main spring is therefore prevented from being injured due to an excessive load being impressed upon the vehicle and also is prevented from being injured by an excessive rebound taking place in response to a road shock.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A vehicle axle, a chassis spring above said axle, a controller comprising a spring below said axle, said springs being rigidly attached to said axle, means inter-connecting the free ends of said springs comprising a U-bolt, said U-bolt extending over one surface of the leaves of one of said springs, a cross-bar, means for causing said cross bar to contact with the other surface of said leaves, and additional cross bars contacting with the upper and lower surfaces of the other of said springs, means being provided for adjusting the position of said cross bars on said U-bolt.

2. In combination with a vehicle spring, a controller therefor comprising an auxiliary spring having characteristics different from said vehicle spring, and means for securing said controller to said vehicle spring comprising a threaded U-bolt extended over said vehicle spring adjacent the free end thereof, a cross bar having a curved surface carried by said U-bolt, members threaded on said U-bolt for bringing the curved surface of said cross bar into engagement with the under-side of said vehicle spring whereby vertical movement of said U-bolt with respect thereto is prevented, second and third cross bars carried by said U-bolt, and threaded means for bringing said second and third cross bars into engagement with the opposite faces of said controller, said threaded means being adjustable whereby the relationship of said controller to said vehicle spring may be varied for imparting the desired characteristics thereto.

In testimony whereof I have hereunto set my hand.

JOHN C. MONTEITH.